UNITED STATES PATENT OFFICE.

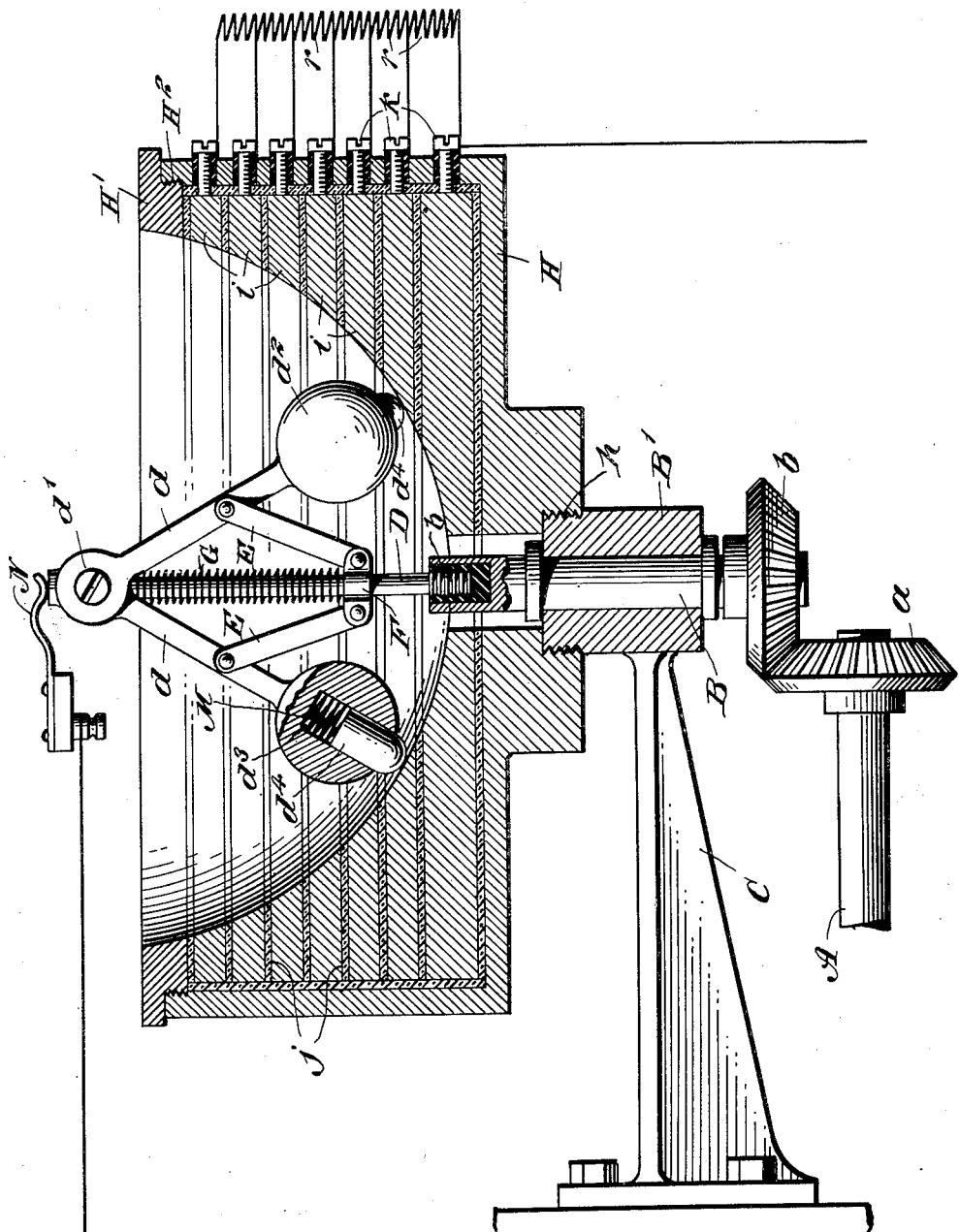

LEOPOLD ROSENBAUM AND FRANK VOGLHUT, OF NEW YORK, N. Y., ASSIGNORS, BY DIRECT AND MESNE ASSIGNMENTS, OF ONE-FOURTH TO MOSES RADIN AND ONE-FOURTH TO ISAAC GERSTEIN, OF NEW YORK, N. Y.

ELECTRIC-CURRENT GOVERNOR FOR DYNAMO-ELECTRIC MACHINES.

No. 909,120.     Specification of Letters Patent.     Patented Jan. 5, 1909.

Application filed January 30, 1908. Serial No. 413,382.

*To all whom it may concern:*

Be it known that we, LEOPOLD ROSENBAUM and FRANK VOGLHUT, subjects of the Emperor of Austria, having, however, duly declared our intention of becoming citizens of the United States, and residents of New York city, N. Y., have invented certain new and useful Improvements in Electric-Current Governors for Dynamo-Electric Machines, of which the following is a specification.

This invention relates to electric current governors which operate by centrifugal force under excessive speed of rotation to cut in resistance into the circuit, and under decrease of speed to cut out resistance, and is adapted to be used with dynamo electric machines of any description. It is exceedingly simple, compact and inexpensive of manufacture.

Our invention is particularly adapted to automatically regulate the current from a small dynamo, when the same is used in the sparking circuit of a gasolene engine of an automobile, and when the invention is used in this connection, it will effectually prevent the burning out of coils, contact fingers, etc. when the speed of the machine is increased.

The invention will be described in detail with reference to the accompanying drawing comprising a side elevational view, partly in section.

Referring to the drawing, A designates the armature shaft of a dynamo electric machine (not shown), which is operatively connected with the main shaft B of the centrifugal device by means of the beveled gear wheels $a\ b$, whereby the shaft B is speeded with corresponding velocity to the velocity of the dynamo electric machine. It is evident, however, that this connection may be made in any way that permits the speed of the shaft B to vary in proportion to the speed of the armature shaft. The shaft B is mounted in a suitable bearing block B' supported in any suitable manner, as by the bracket arm C attached to the body of the machine or other suitable support. Connected to this main shaft B and forming a continuation thereof, but insulated therefrom as shown at $b'$, is an auxiliary shaft D. Attached to this auxiliary shaft at its top so as to rotate therewith are the revoluble centrifugal arms $d\ d$, which arms are pivoted at $d'$ so as to permit the same to move upwardly or downwardly. Said arms are also connected by means of the pivoted links E E and the sliding collar F. A suitable resisting device, such as the spring G, may be employed to resist the upward movement of the sliding collar.

Surrounding the centrifugal device just described is a rheostatic box H of metal or other suitable material, which, as shown, is bored out at its bottom to permit the shaft B to project upwardly therethrough, and is secured to the outer edge of the bearing block B' by means of screw threads, as shown at $h$, or in any other suitable manner. Within the box H and insulated therefrom and from each other by layers of mica or other suitable insulating material are a series of resistance terminal plates $i\ i$. The central portion of these plates $i\ i$, together with the alternately disposed layers of insulating material $j\ j$ are so shaped or hollowed out as to form a cup-shaped basin surrounding the centrifugal device. To these plates $i\ i$ are connected a series of binding posts $k\ k$, which are likewise insulated from said box H, and to the binding posts $k\ k$ are connected the resistances $r\ r$. A cap H' is secured to the upper end of the box H by means of screw threads at $H^2$ and serves to keep the terminal plates in position.

The centrifugal arms $d\ d$ are provided at or near their ends with the weights $d^2\ d^2$, which as shown are in the form of a ball. The weights are provided with bores $d^3$, into which are fitted with a sliding fit the brushes $d^4\ d^4$ of carbon or other suitable material. A spring M is interposed between the end of said bore and the brush, so as to keep the same in constant engagement with the cup-shaped basin formed by the plates $i\ i$ and their insulation. It is obvious that other suitable means might be employed for forming the connection between the centrifugal arms $d\ d$ and the plates $i\ i$, and we do not therefore limit ourselves to the precise means shown.

Electrical connection is made with the top of the shaft D by means of the spring contact N, or other suitable device, and with the binding posts, $k\ k$.

It will be seen that by this construction, the parts may be so arranged that when the speed increases above a predetermined amount the centrifugal weighted arms $d\ d$ will fly out and move the brushes $d^4$ $d^4$ upwardly into contact with successive terminal plates. If the speed decreases, the spring G will tend to return the arms to their initial positions. The above construction permits the brushes to be quickly and easily removed for the purpose of renewal.

The operation of the device will be clear from the foregoing description.

Having described our invention, what we claim and desire to secure by Letters Patent is:—

1. An electric current governor for dynamo electric machines comprising a rotatable shaft connected with the moving part of the machine, a centrifugal device secured to said shaft, brushes carried by said centrifugal device and a rheostatic device having resistance terminals surrounding these centrifugal devices and adapted to connect with the brushes to increase or decrease the resistance.

2. An electric current governor for dynamo electric machines comprising a rotatable shaft connected to the moving part of the machine, a plurality of centrifugal arms connected with said shaft and rotating therewith, brushes carried by such arms, insulated resistance terminal plates surrounding the centrifugal arms, and means for keeping said brushes and terminal plates in constant contact as the centrifugal arms rotate.

3. An electric current governor for dynamo electric machines comprising a rotatable shaft connected with the armature shaft of the machine, weighted centrifugal arms connected to and rotating with said shaft, adjustable brushes carried by said arms, superimposed insulated resistance terminal plates surrounding the centrifugal arms and forming a cup shaped basin, springs for forcing the brushes into contact with such terminal plates as the centrifugal arms rotate.

In witness whereof, we have hereunto subscribed our names in the presence of two subscribing witnesses

LEOPOLD ROSENBAUM.
FRANK VOGLHUT.

Witnesses:
   Jos. F. O'Brien,
   Frank G. Schwab.